United States Patent [19]
Eichler et al.

[11] 3,865,948
[45] Feb. 11, 1975

[54] TREATMENT OF HELMINTH INFECTIONS WITH SUBSTITUTED PHENYL-THIOUREAS

[75] Inventors: David Anthony Eichler, Loughton; Joshua Michael Stuart Lucas, High Ongar; George Christopher James Martin, Brentwood; Edgar William Parnell, Hornchurch; Garth Molesdale Thompson, Upminster, all of England

[73] Assignee: May & Baker Limited, Dagenham, Essex, England

[22] Filed: June 15, 1971

[21] Appl. No.: 153,408

[30] Foreign Application Priority Data
Oct. 21, 1970  Great Britain.................... 50060/70
Apr. 1, 1971  Great Britain..................... 8463/71

[52] U.S. Cl. ............................................. 424/300
[51] Int. Cl............................................ A61k 27/00
[58] Field of Search..................... 424/300; 260/470

[56]         References Cited
   FOREIGN PATENTS OR APPLICATIONS
2,011,165  2/1970  France................................ 424/300
         OTHER PUBLICATIONS
Teruhisa et al., Chem. Abst., Vol. 73 (1970), p. 14,523s.
Patent Journal, (Feb 1970), p. 101.

*Primary Examiner*—Sam Rosen
*Attorney, Agent, or Firm*—Stevens, Davis, Miller & Mosher

[57]         ABSTRACT
Benzene derivatives of the formula:

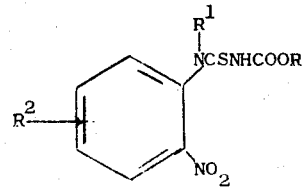

wherein R represents an aliphatic hydrocarbon group optionally substituted by halogen or alkoxy, $R^1$ represents hydrogen or methyl, and $R^2$ represents hydrogen, halogen, alkyl, alkanoylamino optionally substituted by cycloalkyl of 3 to 6 carbon atoms, alkoxycarbonylamino, alkanoyl, benzoyl or N-methylmethanesulphonylamino, possess anthelmintic and anti-viral activity. New compounds within that formula also possess fungicidal properties.

11 Claims, No Drawings

TREATMENT OF HELMINTH INFECTIONS WITH SUBSTITUTED PHENYL-THIOUREAS

This invention relates to benzene derivatives, compositions containing them and their use as anthelmintics, agricultural pesticides and anti-viral agents.

As a result of research and experimentation, it has been found that the benzene derivatives of the general formula:

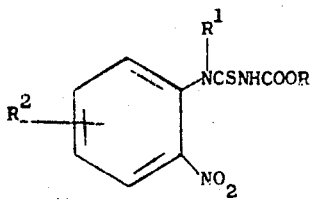

wherein R represents a straight- or branched-chain aliphatic hydrocarbon group containing not more than 4 carbon atoms which may be saturated or unsaturated, e.g., allyl or propargyl, and which may optionally be substituted by a halogen atom, e.g., chlorine, or an alkoxy group containing not more than 4 carbon atoms, $R^1$ represents a hydrogen atom or a methyl group and $R^2$ represents a hydrogen or a halogen atom, e.g., chlorine or fluorine, or a straight- or branched-chain alkyl group containing not more than 4 carbon atoms, an alkanoylamino group containing 1 to 4 carbon atoms in which the alkanoyl moiety may be straight- or branched-chain and may optionally be substituted by a cycloalkyl group containing from 3 to 6 carbon atoms, e.g., acetamido, cyclopropylcarbonamido or cyclohexylacetamido, an alkoxycarbonylamino group containing from 2 to 4 carbon atoms in which the alkoxy moiety may be straight- or branched-chain, a straight- or branched-chain alkanoyl group containing from 2 to 4 carbon atoms, a benzoyl group or a group $CH_3SO_2N(CH_3)$-possess valuable chemotherapeutic properties, having, in particular, high anthelmintic and anti-viral activity.

When the compounds of general formula I can exist in stereoisomeric forms, all such isomers and their mixtures and racemates are included within the scope of the present invention.

According to a feature of the present invention, there is provided a method for the treatment of helminth infections in man and domestic animals, for example cattle, sheep, pigs, goats, poultry and equines, for example infections of the gastrointestinal tract caused by parasitic nematode worms, for example members of the family Trichostrongylidae, in domestic animals, which comprises the administration of an anthelmintically effective amount of one or more compounds of general formula I.

The quantities of the compounds of formula I administered in the treatment of helminthiasis will vary with the species of animal treated, the nature and severity of the infection, the length of treatment and the method of administration. In general, the compounds are effective in treating helminthiasis when administered orally to domestic animals in dosages which may be as low as 5 mg/kg of animal body weight but which are preferably from about 25 mg/kg to about 250 mg/kg of animal body weight. Higher doses up to 500 mg/kg of animal body weight or even as high as 1,000 mg/kg of animal body weight may, however, be used.

The quantities referred to above of the compounds of general formula I may be administered on one or more occasions or divided into a number of smaller doses and administered over a period.

The value of the compounds of formula I as anthelmintics has, for example, been demonstrated in the following tests:

A. Activity against roundworms in rats

Test 1 — Rats were infected with 100 *Nippostrongylus brasiliensis* larvae each, by the subcutaneous route. After 6 days, when the infection was patent, the rats were randomised and allotted to groups of 10 animals each, ready for treatment. One group was used for each dose level of the test compound and, in each experiment, one group was left untreated as a control. All the rats were killed for post-mortem worm counts 48 hours after treatment. The activity, expressed in terms of the percentage reduction in mean worm load of the treated group compared with the untreated group, is shown in Table I.

Test 2 — Rats were infected with 100 *Nippostrongylus brasiliensis* larvae each, by the subcutaneous route. After 24 hours the rats were randomised and allotted to groups of 5 animals each, ready for treatment. Doses of the test compound were then administered to each group by the oral, subcutaneous and intraperitoneal routes respectively, one group of 10 animals being left untreated as a control. All the rats were killed for post-mortem worm counts 6 days after dosing. The activities, expressed in terms of the percentage reductions in mean worm load of the treated groups or damage to the worms compared with the untreated control group, are given below in Table I.

TABLE I

| Test Compound | Test | Dose (mg/kg animal body weight) | Route of Administration | Percentage reduction in *N. brasiliensis* load or worm damage |
|---|---|---|---|---|
| 1-methoxycarbonyl-3-(2-nitrophenyl)-thiourea | 1 | 1000 | oral | 60 and worm damage |
| 1-ethoxycarbonyl-3-(2-nitrophenyl)-thiourea | 1 | 500 | oral | 25 |
| 1-ethoxycarbonyl-3-(5-isopropoxy-carbonylamino-2-nitrophenyl)thiourea | 1 | 1000 | oral | 50 and worm damage |
| | 2 | 1000 | oral | 92 and worm damage |

TABLE I – Continued

| Test Compound | Test | Dose (mg/kg animal body weight) | Route of Administration | Percentage reduction in *N. brasiliensis* load or worm damage |
|---|---|---|---|---|
| 1-methoxycarbonyl-3-(4-fluoro-2-nitrophenyl)thiourea | 2 | 1000 | oral | 77 and worm damage |
| 1-methoxycarbonyl-3-(4-acetamido-2-nitrophenyl)thiourea | 1<br>2 | 1000<br>1000 | oral<br>oral | worm damage<br>70 and worm damage |
| 1-methoxycarbonyl-3-(4-cyclopropylcarbonylamino-2-nitrophenyl)thiourea | 2 | 1000 | oral | 66 and worm damage |
| 1-methoxycarbonyl-3-[4-(N-methylmethanesulphonylamino)-2-nitrophenyl]thiourea | 2 | 1000 | oral | 96 and worm damage |
| 1-allyloxycarbonyl-3-(2-nitrophenyl)-thiourea | 2 | 1000 | oral | 60 |
| 1-propargyloxycarbonyl-3-(2-nitrophenyl)thiourea | 1<br>2 | 1000<br>1000 | oral<br>oral | 36 and worm damage<br>75 and worm damage |
| 1-ethoxycarbonyl-3-(4-acetamido-2-nitrophenyl)thiourea | 1<br>2 | 1000<br>1000 | oral<br>oral | worm damage<br>45 and worm damage |
| 1-methoxycarbonyl-3-(4-methoxycarbonylamino-2-nitrophenyl)thiourea | 1<br>2 | 1000<br>1000 | oral<br>oral | 39 and worm damage<br>77 and worm damage |
| 4-(3-methoxycarbonyl-2-thioureido)-3-nitrobenzophenone | 2 | 1000 | oral | 100 |

B. Activity against roundworms in mice

Mice were infected with approximately 100 *Trichinella spiralis* larvae each, by the oral route. The mice were randomised and allotted to two groups of 4 animals each ready for treatment. Doses of 1-methoxycarbonyl-3-(2-nitrophenyl)thiourea were then administered to one group by the oral route at 2 hours post infection and again at 24 hours post infection, one group of 4 animals being left untreated as a control. The doses given to the mice were 500 mg/kg animal body weight. All the mice were killed for post-mortem examination 5 days after the second dose. The activity, expressed in terms of the percentage reduction in mean worm load of the treated group compared with the control group, was 100 percent.

C. Activity against roundworms in sheep

Activity against *Haemonchus contortus*, *Trichostrongylus axei* and *Trichostrongylus colubriformis* in their 4th larval and adult stages in lambs i. 11 worm-free lambs were each infected with *H. contortus* (approximately 9,000), *T. axei* (approximately 7,000) and *T. colubriformis* (approximately 12,000) infective larvae. After 7 days, 6 lambs were treated orally with 100 mg/kg animal body weight of the 3 test compounds, i.e., 2 lambs per compound, against the 4th larval stages of the worms. 23 Days after infection, all 11 lambs were killed for post-mortem worm counts and the burdens of each worm species in the 6 treated animals compared with those in the remaining 5 untreated control animals. These results are shown hereinafter in Table II.

ii. 8 worm-free lambs were each infected with *H. contortus* (approximately 5,600), *T. axei* (approximately 9,300) and *T. colubriformis* (approximately 10,000) infective larvae. After 22 days, 4 lambs were treated orally with 15 mg/kg animal body weight of the 2 test compounds, i.e., 2 lambs per compound, against the mature adult stages of the worms. Twenty-seven days after infection, all 8 lambs were killed for post-mortem worm counts and the burden of each worm species in the 4 treated animals compared with those in the remaining 4 untreated control animals. These results are shown hereinafter in Table III.

TABLE II

| Compound | Mean percentage reduction in worm burdens | | |
|---|---|---|---|
| | *H.contortus* | *T.axei* | *T.colubriformis* |
| 1-methoxycarbonyl-3-(2-nitrophenyl)-thiourea | 100 | 100 | 99.9 |
| 1-methoxycarbonyl-3-(4-n-butyl-2-nitrophenyl)thiourea | 100 | 97.1 | 99.8 |
| 1-ethoxycarbonyl-3-(2-nitrophenyl)thiourea | 100 | 100 | 100 |

TABLE III

| Compound | Mean percentage reduction in worm burdens | | |
|---|---|---|---|
| | H.contortus | T.axei | T.colubriformis |
| 1-ethoxycarbonyl-3-(2-nitrophenyl)thiourea | 23.2 | 50.7 | 0 |
| 1-ethoxycarbonyl-3-(5-isopropoxycarbonylamino-2-nitrophenyl)thiourea | 53.2 | 87.1 | 27.8 |

D. In vitro activity against roundworms

Compounds of formula I were tested at concentrations of 100 $\mu$g/ml, 10 $\mu$g/ml, 1 $\mu$g/ml and 0.1 $\mu$g/ml in small glass containers. If the compound was not soluble in water, a volatile organic medium, e.g., acetone, chloroform, ethanol or methanol was used. An amount of material appropriate for each final concentration was measured and placed in duplicate test containers and if an organic solvent was used it was allowed to evaporate completely.

Nippostrongylus brasiliensis eggs were recovered by saturated saline centrifugal flotation from the faeces of rats heavily infected with third stage larvae 6 days previously. They were washed several times in water and suspended in water in a suitable concentration. From 25–50 eggs were placed in each container and the final volume was made up by the addition of a very dilute aqueous suspension of mouse faeces which served as the growth medium.

The minimum inhibitory concentrations of each compound (M.I.C.), shown the following Table IV, was the minimum concentration in $\mu$g/ml total liquid volume at which it inhibited or delayed hatching of eggs, or at which it killed, retarded growth or reduced activity of larvae during the 4 days after beginning the test.

TABLE IV

| COMPOUND | M.I.C. ($\mu$g/ml) |
|---|---|
| 1-methoxycarbonyl-3-(2-nitrophenyl)thiourea | 100.0 |
| 1-methoxycarbonyl-3-(4-n-butyl-2-nitrophenyl)-thiourea | 1.0 |
| 1-ethoxycarbonyl-3-(2-nitrophenyl)thiourea | 1.0 |
| 1-methoxycarbonyl-3-(4-chloro-2-nitrophenyl)-thiourea | 10.0 |
| 1-methoxycarbonyl-3-(4-fluoro-2-nitrophenyl)thiourea | 10.0 |
| 1-ethoxycarbonyl-3-(4-fluoro-2-nitrophenyl)thiourea | 1.0 |
| 1-methoxycarbonyl-3-(4-acetamido-2-nitrophenyl)-thiourea | 100.0 |
| 1-allyloxycarbonyl-3-(2-nitrophenyl)thiourea | 100.0 |
| 1-propargyloxycarbonyl-3-(2-nitrophenyl)thiourea | 10.0 |
| 1-ethoxycarbonyl-3-(4-acetamido-2-nitrophenyl)-thiourea | 100.0 |
| 1-methoxycarbonyl-3-(4-methoxycarbonylamino-2-nitrophenyl)thiourea | 10.0 |
| 1-(4-cyclohexylacetylamino-2-nitrophenyl)-3-methoxycarbonyl thiourea | 100.0 |

E. Activity against tapeworms

A suspension of Hymenolepis nana embryophores was prepared by grinding adult worms (taken from the small intestines of mice infected three weeks previously) in physiological saline in a mortar. The suspension was filtered and the number of embryophores counted.

Mice were infected by oral administration of 1 ml of this suspension containing 1,000 mature embryophores.

After 21 days, where the infection was patent, the mice were treated with a single oral administration of 1-methoxycarbonyl-3-(2-nitrophenyl)thiourea. Three days after this treatment the mice, fasting since the night before, were killed, and the worms present in the small intestine were counted.

The dose of the compound which rendered 50 percent of the mice completely free of parasites was calculated.

The results are summarised in Table V.

TABLE V

| Test Compound | Oral Dose mg/kg | No. of mice treated | No. of mice cured | *CD$_{50}$ mg/kg p.o. |
|---|---|---|---|---|
| 1-methoxycarbonyl-3-(2-nitrophenyl)-thiourea | 0 | 10 | 0 | |
| | 250 | 6 | 0 | |
| | 500 | 6 | 2 | 800 |
| | 1000 | 6 | 3 | |

*CD$_{50}$ = Median curative dose

The compounds of general formula I also possess valuable anti-viral activity, for example against the myxovirus A$_2$/Hong Kong/5/68 which causes influenza in man. The quantities of the compounds of formula I administered in the treatment of viral infections will vary with the species of animal treated, the nature and severity of the infection, the length of treatment and the method of administration. In general, the compounds are effective in treating viral infections, more particularly infections of virus $A_2$/Hong Kong/5/68, when administered orally at dosages between 50 and 250 mg/kg of animal body weight. The quantities may be administered on one or more occasions or divided into a number of smaller doses and administered over a period.

The anti-viral activity of the compounds of general formula I has, for example, been demonstrated in the following test:

Groups of five mice, each weighing approximately 20 g., were dosed with the test compound at a rate of 250 mg/kg animal body weight by oral administration. Three hours later each animal was infected by intranasal inoculation with 0.02 ml. of a $10^{-1}$ dilution of a suspension of lung tissue, disintegrated by ultrasonic vibration, from mice infected with influenza virus type $A_2$/Hong Kong/5/68. One hour after infection, the animals were again dosed orally with the test compound at the same rate of administration. Twenty four hours after infection, the mice were killed, the lungs removed and those from the five animals which had received the same test compound were pooled and disintegrated by ultrasonic vibration in phosphate-buffered saline to give a 10 percent w/v suspension. After incubation for one hour at 37°C. and centrifugation, the supernatant fluid was removed and serially diluted from a concentration of 1/2 to 1/8192. The viral content was then determined by the addition of a 0.5% w/v suspension of chicken blood red cells to determine the greatest dilution of supernatant fluid which produced agglutination of the chicken blood red cells (the haemagglutinin titre) and compared with the corresponding haemagglutinin titre obtained from similarly infected, untreated, control animals.

The results obtained are set out in the following Table VI.

ciation with a significant amount of a pharmaceutically-acceptable carrier or coating. The invention includes especially such compositions made up for oral administration, for example, a tablet, pill, capsule or bolus, or more particularly, a paste, gel or drench.

Solid compositions for oral administration include compressed tablets, pills, boluses and granules, which may optionally be coated with a pharmaceutically acceptable alkali-stable or acid-stable material (e.g., an enteric coating) and dispersible powders. In such solid compositions one or more of the active compounds is or are admixed with at least one inert diluent such as potato starch, alginic acid, sucrose, lactose, or a resin. The compostions may also comprise, as is normal practice, additional substances other than inert diluents, e.g., lubricating agents such as magnesium stearate. Semi-solid compositions for oral administration include pastes and gels containing the active substance and a suitable inert diluent such as polyethylene glycol (6,000). Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise compatible adjuvants such as wetting, suspending and emulsifying agents and stabilising, thickening, perfuming, sweetening and flavouring agents. The compositions according to the invention for oral administration also include capsules of absorbable material such as gelatin containing one or more of the active substances with or without the addition of diluents or excipients.

Preparations according to the invention for parenteral administration include sterile aqueous, aqueous-organic and organic solutions, suspensions and emulsions. Examples of organic solvents or suspending media are propylyene glycol, polyethylene glycol, vegetable oils such as olive oil and injectable organic esters such as ethyl oleate. These compositions may also contain adjuvants such as stabilising, preserving, wetting,

TABLE VI

| Test Compound | Haemagglutinin titre-treated animals | Haemagglutinin titre-control animals |
|---|---|---|
| 1-ethoxycarbonyl-3-(4-acetamido-2-nitrophenyl)-thiourea | 1/256 | 1/2048 |
| 1-methoxycarbonyl-3-(4-methoxycarbonylamino-2-nitrophenyl)thiourea | 1/256 | 1/2048 |
| 1-methoxycarbonyl-3-(4-n-butyl-2-nitrophenyl)-thiourea | 1/1024 | 1/8192 |
| 1-methoxycarbonyl-3-(4-chloro-2-nitrophenyl)-thiourea | 1/512 | 1/8192 |
| 1-(2-chloroethoxycarbonyl)-3-(2-nitrophenyl)thiourea | 1/512 | 1/8192 |

The compounds of general formula I are conveniently administered as anthelmintics and anti-viral agents in the form of compositions in a unit dosage form, and the present invention includes within its scope therapeutically-useful, more especially veterinary, compositions which comprise, as active ingredient, at least one benzene derivative of formula I in association with a significant amount of a pharmaceutical.

emulsifying and dispersing agents. They may be sterilised, for example, by filtration through a bacteria-retaining filter, by incorporation in the compositions of sterilising agents, or by heating. They may also be manufactured in the form of sterile solid compositions, which can be dissolved in sterile water or some other sterile injectable medium immediately before use.

The percentage of the benzene derivatives of formula I in the above compositions may be varied, it being necessary that it should constitute a proportion such that a suitable dosage for the therapeutic effect desired shall be obtained. In general, compositions containing from about 5 percent to about 90 percent by weight of active ingredient are satisfactory.

For therapeutic purposes, particularly when continuous administration over a period is desired, the compounds of general formula I may be administered dispersed in, or mixed with, animal feedstuffs, drinking water and other liquids normally consumed by the animals, or in compositions containing the benzene derivatives dispersed in or mixed with any other suitable inert physiologically innocuous carrier or diluent which is orally administrable. By the term 'inert physiologically innocuous carrier or diluent' is meant a carrier or diluent which is substantially non-reactive with the active ingredient and is not harmful to the animals on oral administration. Such compositions may be administered in the form of powders, pellets, solutions, suspensions and emulsions, to the animals to supply the desired dosage of the benzene derivatives or used as concentrates or supplements to be diluted with additional carrier, feedstuff, drinking water or other liquids normally consumed by the animals, before administration. Suitable inert physiologically innocuous carriers or diluents include wheat flour or meal, maize gluten, lactose, glucose, sucrose, talc, kaolin, calcium phosphate, potassium sulphate and diatomaceous earths such as keiselguhr. Concentrates or supplements intended for incorporation into drinking water or other liquids normally consumed by the animals to give solutions, emulsions or stable suspensions, may also comprise the active ingredient in association with a surface-active wetting, dispersing or emulsifying agent such as Teepol, polyoxyethylene(20)sorbitan mono-oleate or the condensation product of β-naphthalenesulphonic acid with formaldehyde, with or without a physiologically innocuous, preferably water-soluble, carrier or diluent, for example, sucrose, glucose or an inorganic salt such as potassium sulphate, or concentrates or supplements in the form of stable dispersions or solutions obtained by mixing the aforesaid concentrates or supplements with water or some other suitable physiologically innocuous inert liquid carrier or diluent, or mixtures thereof.

The compositions described above may be prepared by mixing the benzene derivatives of formula I with the inert physiologically innocuous carriers or diluents in any manner known to the art. Solid compositions are conveniently prepared by intimately mixing or dispersing the benzene derivatives uniformly throughout the feedstuffs or other solid carrier or diluent by methods such as grinding, stirring, milling or tumbling or by dissolving the benzene derivatives in a solvent, e.g., water or a suitable organic solvent, dispersing the solution so obtained in the feedstuff or other solid carrier or diluent and removing the solvent by any means known to the art. Medicated feedstuffs may also be prepared by mixing in concentrates or supplements containing higher concentrates of active ingredient to give feedstuffs throughout which the benzene derivatives are uniformly distributed at the desired concentration. The desired concentration of active ingredient in the compositions of the present invention is obtained by the selection of an appropriate ratio of the benzene derivatives to carrier or diluent.

Medicated feedstuffs will normally contain between 0.001 and 3 percent by weight of the benzene derivatives of formula I to give the required dosage. Concentrates and supplements will normally contain between 5 and 90 percent, preferably 5 to 50 percent, by weight of the benzene derivatives being, if desired, suitably diluted as hereinbefore described to give the required dosage.

Medicated animal feedstuffs, drinking water and other liquids normally consumed by the animals and compositions containing the benzene derivatives of formula I dispersed in, or admixed with, any other suitable inert carrier or diluent, as hereinbefore described, including concentrates or supplements, form further features of the present invention.

Compositions according to the present invention may also contain bacteriostats, bactericidal agents, sporicidal agents and pharmaceutically-acceptable colouring agents. The compositions may also contain, if desired, auxiliary therapeutic agents, for example fluke drugs such as 4-cyano-2-iodo-6-nitrophenol, hexachloroethane, carbon tetrachloride, 3,3', 5,5', 6,6'-hexachloro-2,2'-dihydroxy-diphenylmethane, 2,2'-dihydroxy-3,3',5,5',6-pentachlorobenzanilide, 2,2'-dihydroxy-3,3'-dinitro-5,5'-dichlorodiphenyl or 2-acetoxy-4'-chloro-3,5-diiodobenzanilide,2-(4-thiazolyl)benzimidazole, 5(6)-isopropoxycarbonylamino-2-(4-thiazolyl)benzimidazole, methyl 5(6)-butyl-2-benzimidazolecarbamate, methyl 5(6)-benzoyl-2-benzimidazolecarbamate, 6-phenyl-2,3,5,6-tetrahydroimidazo[2,1-b]-thiazole, trans-1,4,5,6-tetrahydro-1-methyl-2-(2-thien-2'-ylvinyl)pyrimidine, phenothiazine, cyanacethydrazide, piperazine and its salts such as piperazine adipate, 1-diethylcarbamoyl-4-methylpiperazine, tetrachloroethylene, 4,4'-dichloro-2,2'-dihydroxydiphenylmethane, N-(2-chloro-4-nitrophenyl)-5-chlorosalicylamide, N,N-dibutyl-4-hexyloxynaphthamidine, trans-1,4-bis-(2-isothiocyanatoethyl)-cyclohexane and 1-styrylpyridinium salts, e.g., the bromide, embonate, amsonate or isethionate.

Compounds of general formula I may be prepared by the suitable adaptation of known methods, for example by the reaction of an isothiocyanate of the general formula:

$$SCNCO_2R$$

II (wherein R is as hereinbefore defined) with an amine of the general formula:

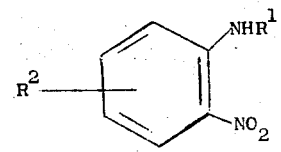

III wherein $R^1$ and $R^2$ are as hereinbefore defined. The reaction may be carried out in the presence of an inert solvent, for example a lower alkanone, e.g., acetone or methylethylketone, a lower alkanol, e.g., methanol or ethanol, dioxan, acetonitrile or an aromatic hydrocarbon, e.g., toluene, at a temperature between 0° and 150°C. and preferably at between 10° and 60°C.

The reaction is preferably carried out in the presence of an excess of the isothiocyanate of formula II.

The isothiocyanates of general formula II may be prepared by the reaction of an ester of the general formula:

XCO₂R (wherein R is as hereinbefore defined and X is a bromine, iodine or, preferably, chlorine atom) and a thiocyanate of the general formula:

(NCS)$_q$M (wherein M is a metal, preferably an alkali metal or an alkaline earth metal, atom and q is the valency of that metal). The reaction may be carried out in the presence of an inert organic solvent, for example a lower alkanone, e.g., acetone, or acetonitrile, at a temperature between 0° and 100°C., and preferably between 20° and 50°C.

The preparation of compounds of formula II may be effected in situ for subsequent reaction with compounds of formula III or, if desired, the compounds of formula II may be isolated by known methods prior to reaction with compounds of formula III.

Compounds of general formula III, wherein $R^1$ and $R^2$ are as hereinbefore defined may be prepared by known methods for the preparation of ortho-nitroanilines and N-methyl-ortho-nitroanilines.

Those starting materials of general formula III, wherein $R^2$ is an alkanoylamino, cycloalkylcarbonamido or alkoxycarbonylamino group as hereinbefore defined, and $R^1$ is as hereinbefore defined, can, for example, be prepared by reaction of a compound of the general formula:

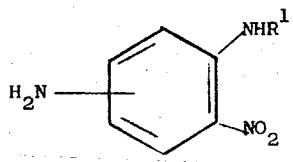

IV (wherein $R^1$ is as hereinbefore defined) with an acid halide, e.g., chloride, or anhydride of an alkanoic acid containing 2 to 4 carbon atoms and which may optionally be substituted by a cycloalkyl group containing from 3 to 6 carbon atoms, an acid halide, e.g., chloride, or anhydride of a cycloalkane carboxylic acid containing from 3 to 6 carbon atoms in the cycloalkane moiety, or with an alkyl haloformate, e.g., a chloroformate, containing 2 to 4 carbon atoms and wherein the alkyl moiety may be straight- or branched-chain. The reaction is preferably carried out in an inert organic solvent, for example a lower alkanone, e.g., acetone, in the presence of a basic condensing agent, for example an alkali metal (e.g., sodium) bicarbonate, at a temperature between 20° and 100°C. and preferably at the reflux temperature of the reaction mixture.

By the term 'known methods' as used in the present specification is meant methods heretofore used or described in the chemical literature.

In British Pat. No. 1,214,415, granted to Nippon Soda Company Limited on an application filed June 13, 1969, there are disclosed inter alia compounds of the general formula:

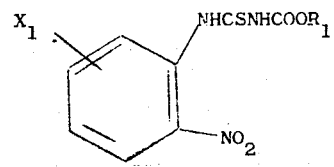

V wherein $R_1$ represents an alkyl group containing from 1 to 4 carbon atoms, and $X_1$ represents a hydrogen or chlorine atom or a nitro or methyl group or, when $X_1$ is in ortho-position to the grouping —NHCSNHCOOR₁, a group —NH R₂, in which R₂ represents a formyl group, an alkanoyl group containing 2 or 3 carbon atoms, a cyclopropylcarbonyl group, or an alkoxycarbonyl group containing 2 or 3 carbon atoms. The compounds of general formula V are disclosed in the aforesaid patent either as starting materials for benzene derivatives possessing fungicidal and acaricidal properties or as having such properties themselves.

This invention therefore includes within its scope, as new and useful compounds, those benzene derivatives of general formula I wherein R, $R^1$ and $R^2$ are as hereinbefore defined with the proviso that when R is an alkyl group containing not more than 4 carbon atoms and $R^1$ is a hydrogen atom, $R^2$ is other than a hydrogen or chlorine atom or methyl group, or is additionally other than an alkanoylamino group containing 1 to 3 carbon atoms, a cyclopropylcarbonamido group or an alkoxycarbonylamino group containing 2 or 3 carbon atoms when $R^2$ is in ortho-position in relation to the grouping —NR¹CSNHCOOR. For convenience in referring hereinafter to these new compounds of the invention they will be identified as a class by reference to "general formula VI" although no formula will actually be depicted.

Examples of groups of compounds within this class of new benzene derivatives are:

a. Compounds wherein $R^1$ is a hydrogen atom, $R^2$ is a fluorine atom, a straight- or branched-chain alkyl group containing 2 to 4 carbon atoms, e.g., n-butyl, a straight- or branched-chain alkanoylamino group containing 1 to 4 carbon atoms substituted by a cycloalkyl group containing from 3 to 6 carbon atoms, e.g., cyclopropyl or cyclohexyl, a straight- or branched-chain alkanoyl group containing 2 to 4 carbon atoms, e.g., acetyl, a benzoyl group, an N-methylmethanesulphonylamino group, a straight- or branched-chain alkanoylamino group containing 1 to 4 carbon atoms, e.g., acetamido, or a straight- or branched-chain alkoxycarbonylamino group containing 2 to 4 carbon atoms, e.g., methoxycarbonylamino or isopropoxycarbonylamino, in the meta or para position relative to the grouping —NR¹CSNHCOOR, and R is a straight- or branched-chain aliphatic hydrocarbon group containing not more than 4 carbon atoms, e.g., methyl, ethyl or allyl.

b. Compounds wherein $R^1$ and $R^2$ are hydrogen atoms and R is a straight- or branched-chain aliphatic hydrocarbon group containing not more than 4 carbon atoms substituted by an alkoxy group containing not more than 4 carbon atoms, e.g., ethoxyethyl.

In addition to possessing anthelmintic and anti-viral activity, the new compounds of general formula VI are also useful as agricultural pesticides, in particular as fungicides against species of fungi which are pathogenic to plants, and are also active as fungicides against fungal species which are pathogenic to animals, in particular *Trichophyton menthagrophytes*.

As fungicides for use against species of fungi pathogenic to plants, the new compounds of general formula VI, e.g., 1-methoxycarbonyl-3-(4-fluoro-2-nitrophenyl)thiourea, are particularly useful in the control of *Alternaria solani, Botrytis cinerea, Cercopora beticola, Cladosporium fulvum, Collectotrichum lagenerium, Corynespora melongenae, Elsinoe fawcetti, Erysiphe graminis, Fusarium sambucinum, Glomerella cingulata, Helminthosporium* spp., e.g., *H. signoideum* and *H. avenae, Mycosphaerella* spp., e.g., *M. pomi* and *M. pinodes, Pellicularia sasaki, Penicillium* spp., *Phaeoisariopsis vitis, Piricularia oryzae, Podosphaerea leucotricha, Pseudoperonospora humuli, Sclerotinia* spp., e.g., *S. cinerea* and *S. sclerotiorum, Sphaerotheca*, spp., e.g., *S. fuliginea* and *S. humuli* and *Venturia inaequalis*

The new compounds of general formula VI may be used as fungicides against fungi pathogenic to plants in the form of fungicidal compositions, suitable for use in agriculture, containing as active ingredient at least one of the benzene derivatives of general formula VI in association with one or more diluents compatible with the benzene derivatives and suitable for use in fungicidal compositions. Preferably the compositions contain between 0.005 and 95 percent by weight of the compounds of general formula VI. Suitable solid diluents include aluminium silicate, kieselguhr, tricalcium phosphate, powdered cork, adsorbent carbon black, magnesium silicate, a clay such as kaolin, bentonite or attapulgite or a compatible solid wetting, dispersing or emulsifying agent. The compositions containing solid diluents, which may take the form of dusts or wettable powders, are prepared by impregnating the solid diluents with solutions of the compounds of general formula VI in volatile solvents and evaporating the solvents, or by injecting those compounds of general formula VI which are viscous liquids at room temperature, under high pressure into a suitable powder-blender containing the solid diluent or diluents, and, if necessary, grinding the products so as to obtain powders.

The wetting, dispersing and emulsifying agents which may be present, particularly in wettable powders, may be of the ionic or non-ionic types, for example, sulphoricinoleates, quaternary ammonium derivatives or products based upon condensates of ethylene oxide with nonyl and octyl phenol, or fatty acid esters of anhydrosorbitols which have been rendered soluble by etherification of the free hydroxy groups by condensation with ethylene oxide, or mixture of these types of agents. Wettable powders according to the present invention may be treated with water immediately before use to give suspensions ready for application.

Liquid compositions may take the form of solutions, suspensions and emulsions of the compounds of general formula VI which may, if desired, incorporate wetting, dispersing or emulsifying agents. These emulsions, suspensions and solutions may be prepared using aqueous, organic or aqueous-organic diluents, for example acetophenone, isophorone, toluene, xylene and mineral, animal or vegetable oils (and mixtures of these diluents), which may contain wetting, dispersing or emulsifying agents of the ionic or non-ionic types or mixtures thereof, for example those of the types described above. When desired, the emulsions containing the compounds of general formula VI may be used in the form of self-emulsifying concentrates containing the active substances dissolved in the emulsifying agents or in solvents containing emulsifying agents compatible with the active substance, the simple addition of water to such concentrates producing compositions ready for use. Fungicidal compositions in the form of aerosols containing the compounds of general formula VI are also within the scope of the present invention. If desired, the fungicidal compositions according to the present invention may contain other adjuvants such as adhesives.

Accordingly, there is provided a method for the destruction of fungi pathogenic to plants which comprises the application of the fungicidal compositions comprising compounds of general formula VI, if necessary after suitable dilution, to crop-growing areas infested with these fungi. By the term 'cropgrowing areas' is meant areas in which economically valuable crops are growing. Preferably the fungicidal compositions are applied at rates of from 0.5 to 3 lbs. of benzene derivative per acre, more particularly in the form of aqueous sprays prepared by diluting concentrates with water.

The new compounds of general formula VI may be used as fungicides against fungi pathogenic to animals in the form of therapeutically useful compositions comprising at least one of the compounds in association with a pharmaceutically-acceptable carrier or coating of the type hereinbefore described as suitable for the use of compounds of general formula I as anthelmintics and anti-viral agents. Therapeutically useful compositions comprising at least one of the new compounds of general formula VI for use against fungi pathogenic to animals may be formulations suitable for topical application, e.g., lotions, ointments or creams.

The following Examples illustrate the preparation of new compounds according to the present invention:

EXAMPLE 1

Dry potassium thiocyanate (18.5 g), ethyl chloroformate (15.5 g) and dry acetonitrile (65 ml) were mixed with stirring at laboratory temperature and stirring was continued for 1 hour at 45°–55°C. The mixture was then cooled in an ice bath to 15°C. and 4-n-butyl-2-nitroaniline (19.0 g) was added in portions with stirring during 15 minutes, the temperature of the stirred reaction mixture being maintained between 15° and 18°C. during the addition. When the addition was complete the mixture was stirred at 15°C. for 2 hours, poured into water (1 litre), and the yellow solid which separated was filtered off and washed with water. This crude product was recrystallised from cyclohexane to give 1-ethoxycarbonyl-3-(4-n-butyl-2-nitrophenyl)thiourea (26.9 g), m.p. 121°–123°C.

By proceeding in a similar manner, but substituting the appropriate quantities of 4-isopropoxycarbonylamino-2-nitroaniline, 5-isopropoxycarbonylamino-2-nitroaniline, 4-fluoro-2-nitroaniline and 4-acetamido-2-nitroaniline for the 4-n-butyl-2-nitroaniline, there were prepared the following compounds of formula I: 1-ethoxycarbonyl-3-(4-isopropoxycarbonylamino-2-nitrophenyl)thiourea, m.p. 163°–165°C. (with decomposition), 1-ethoxycarbonyl-3-(5-isopropoxycarboylamino-2-nitrophenyl)thiourea, m.p. 137°–139°C, (with decomposition), 1-ethoxycarbonyl-3-(4-fluoro-2-nitrophenyl)thiourea, m.p. 155°–157°C. (with decomposition), and 1-ethoxycarbonyl-3-(4-acetamido-2- nitrophenyl)thiourea, m.p. 202°–204°C. (with decomposition), respectively.

EXAMPLE 2

Dry potassium thiocyanate (42.8 g; 0.44 mole), methyl chloroformate (37.8 g; 0.40 mole) and dry acetonitrile (130 ml) were mixed with stirring at laboratory temperature and stirring was continued for 1 hour at 35°–45°C. The mixture was then cooled in an ice bath to 15°C. and 4-n-butyl-2-nitroaniline (38.8 g; 0.2 mole) was added in portions with stirring during 15 minutes, the temperature of the stirred reaction mixture being maintained between 15 and 18°C. during the addition. When the addition was complete the mixture was stirred at 15°C. for 2 hours, poured into water (1 litre), and the yellow solid which separated was filtered off and washed with water. This crude product was recrystallised from ethanol to give 1-methoxycarbonyl-3-(4-n-butyl-2-nitrophenyl)thiourea (47.8 g), m.p. 164°–165°C. (with decomposition).

By proceeding in a similar manner, but substituting the appropriate quantities of 4-isopropoxycarbonylamino-2-nitroaniline, 4-amino-3-nitroacetophenone, 4-fluoro-2-nitroaniline, 4-amino-3-nitrobenzophenone, 4-acetamido-2-nitroaniline, 4-cyclopropylcarbonamido-2-nitroaniline, 4-cyclohexylacetamido-2-nitroaniline, 4-methoxycarbonylamino-2-nitroaniline and 4-(N-methylmethanesulphonylamino)-2-nitroaniline for the 4-n-butyl-2-nitroaniline, there were prepared:

1-methoxycarbonyl-3-(4-isopropoxycarbonylamino-2-nitrophenyl)thiourea, m.p. 180°–181°C. (with decomposition), 1-methoxycarbonyl-3-(4-acetyl-2-nitrophenyl)thiourea, m.p. 181°–182°C. (with decomposition), 1-methoxycarbonyl-3-(4-fluoro-2-nitrophenyl)thiourea, m.p. 196°–198°C. (with decomposition), 1-methoxycarbonyl-3-(4-benzoyl-2-nitrophenyl)thiourea, m.p. 177°–179°C., 1-methoxycarbonyl-3-(4-acetamido-2-nitrophenyl)thiourea, m.p. 215°–217°C. (with decomposition), 1-methoxycarbonyl-3-(4-cyclopropylcarbonamido-2-nitrophenyl)thiourea, m.p. 200°–203°C. (with decomposition), 1-methoxycarbonyl-3-(4-cyclohexylacetamido-2-nitrophenyl)thiourea, m.p. 158°–160°C., 1-methoxycarbonyl-3-(4-methoxycarbonylamino-2-nitrophenyl)thiourea, m.p. 209°–210°C. (with decomposition) and 1-methoxycarbonyl-3-[4-(N-methylmethanesulphonylamino)-2-nitrophenyl]thiourea, m.p. 187°–189°C. (with decomposition), respectively.

By proceeding in a similar manner, but substituting the appropriate quantities of 2-nitroaniline for the 4-n-butyl-2-nitroaniline and allyl chloroformate and 2-ethoxyethyl chloroformate for the methyl chloroformate, there were prepared 1-allyloxycarbonyl-3-(2-nitrophenyl)thiourea, m.p. 127°–128°C., and 1-(2-ethoxyethoxycarbonyl)-3-(2-nitrophenyl)thiourea, m.p. 143°–145°C. (with decomposition), respectively The 4-isopropoxycarbonylamine-2-nitroaniline and 5-isopropoxycarbonylamino-2-nitroaniline used as starting materials in the above Example 1 and 4-(N-methylmethanesulphonylamino)-2-nitroaniline used as a starting material in Example 2 were prepared as follows hereinafter. The other anilines used as starting materials in the above Examples 1 and 2, except as hereinafter indicated, are articles of commerce.

i. A stirred suspension of 2,5-diaminonitrobenzene (60 g) in a solution of sodium bicarbonate (49.4 g) in water (780 ml) at 10°C. was treated dropwise with isopropyl chloroformate (48 g) and the mixture was stirred at room temperature for 3 hours. The crude brown solid was filtered off, washed well with water and dried to give 4-isopropoxycarbonylamino2-nitroaniline (90.0 g), m.p. 158°–160°C., which was used in the next stage of the synthesis without further purification being necessary. Recrystallisation of a sample from toluene gave pure 4-isopropoxycarbonylamino-2-nitroaniline, m.p. 161°–163°C.

By proceeding in a similar manner, but substituting an equimolecular quantity of methyl chloroformate for the isopropyl chloroformate, there was obtained 4-methoxycarbonylamino-2-nitroaniline, m.p. 171°–172°C.

ii. A stirred suspension of 2,4-diamino-nitrobenzene (3 g) and sodium bicarbonate (2.5 g) in acetone (39 ml) was treated dropwise at room temperature with isopropyl chloroformate (2.4 g) and the mixture was stirred overnight at room temperature. Inorganic material was filtered off and the solvent was removed from the filtrate in vacuo to give a solid which was recrystallised from toluene to give 5-isopropoxycarbonylamino-2-nitroaniline (2.34 g), a yellow solid, m.p. 142°–145°C.

By proceeding in a similar manner, but substituting equimolecular quantities of cyclopropanecarbonyl chloride and cyclohexylacetyl chloride for the isopropyl chloroformate, there were obtained 4-cyclopropylcarbonamido-2-nitroaniline, m.p. 211°–213°C, and 4-cyclohexylacetamido-2-nitroaniline, m.p. 164°–166°C., respectively.

iii. 4-(N-methylamino)-o-nitroaniline (8.0 g), sodium bicarbonate (8.05 g) and acetone (120 ml) were mixed together at laboratory temperature. The mixture was cooled to 15°C. in an ice bath and methanesulphonyl chloride (5.6 g) was added dropwise during 10 minutes and the mixture was stirred for 6 hours at laboratory temperature. Additional methanesulphonyl chloride (3.0 g) and sodium bicarbonate (4.2 g) were then added, and stirring was continued at laboratory temperature for a further 18 hours when the dark solution was filtered from the suspended solid and the filtrate was evaporated to give a dark solid. This solid was triturated with diethyl ether, filtered off, washed well with diethyl ether and crystallised (charcoal) from ethanol to give 4-(N-methylmethanesulphonylamino)-o-nitroaniline (8.5 g) as an orange solid, m.p. 171°–173°C.

Other compounds of general formula I which may be obtained by the procedures described in the foregoing Examples are:

1-ethoxycarbonyl-3-(2-nitrophenyl)thiourea, m.p. 124°–126°C., 1-ethoxycarbonyl-3-(4-chloro-2-nitrophenyl)thiourea, m.p. 191°–193°C., 1-methoxycarbonyl-3-(4-methyl-2-nitrophenyl)thiourea, m.p. 196°–198°C., 1-methoxycarbonyl-3-(2-nitrophenyl)thiourea, m.p. 182°–183.5°C., and 1-methoxycarbonyl-3-(4-chloro-2-nitrophenyl)thiourea, m.p. 196.5°–198.5°C.

All the above-mentioned melting points were with decomposition of the specified product except for the first compound.

The following Examples illustrate the formulation of therapeutically useful compositions including benzene derivatives of general formula I.

EXAMPLE 3

A wettable powder was made up from the following components:

| | |
|---|---|
| 1-ethoxycarbonyl-3-(2-nitrophenyl)thiourea | 50% w/w |
| finely-divided synthetic magnesium silicate | 41% w/w |
| micronised silica | 2% w/w |
| wetting agent (blend of polyoxyethylene alkyl ethers, polyoxyethylene fatty acids and their esters) | 7% w/w | by mixing the components and milling them in an air-jet miller.

Wettable powders were also made up by substituting equal weights of 1-methoxycarbonyl-3-(4-isopropoxycarbonylamino-2-nitrophenyl)thiourea and 1-methoxycarbonyl-3-(4-n-butyl-2-nitrophenyl)thiourea for the 1-ethoxycarbonyl-3-(2-nitrophenyl)thiourea in the above procedure. The resultant wettable powders were made up in 50–70 percent w/w dispersions in water for administration to sheep.

EXAMPLE 4

1-Methoxycarbonyl-3-(2-nitrophenyl)thiourea (1 g), previously sifted through a 40 mesh British Standard sieve, is packed into a gelatin capsule.

EXAMPLE 5

A preparation for oral administration is obtained by mixing 1-methoxycarbonyl-3-(2-nitrophenyl)thiourea (1 g) previously sifted through a 40 mesh British Standard sieve, and polyethylene glycol 6,000 (10 g) at 50°C. and cooling to 25°C. to obtain a gel.

EXAMPLE 6

1-Methoxycarbonyl-3-(2-nitrophenyl)thiourea (18 parts by weight) is added to wheat middlings (82 parts by weight) and intimately mixed to give a concentrate suitable for incorporation in an animal feedstuff at a rate sufficient to give an anthelmintically-effective amount of the benzene derivative in the feedstuff consumed by the animal. If desired, conventional adhesive agents may be incorporated into the concentrate which may then be compressed into pellets. The pellets may be fed to animals at a rate sufficient to administer an anthelmintically-effective amount of the benzene derivatives to the animal, if desired mixed with an animal feedstuff.

EXAMPLE 7

1-Methoxycarbonyl-3-(2-nitrophenyl)thiourea (5 parts by weight) was added to limestone flour (20 parts by weight). The mixture was ground to give a concentrate suitable for incorporation in an animal feedstuff at a rate sufficient to give an anthelmintically-effective amount of the benzene derivative in the feedstuff consumed by the animal.

EXAMPLE 8

A suspension for oral administration for use as an anthelmintic is obtained by mixing diethylcarbamazine citrate (4.4 g; prepared as described in U.S. Pat. No. 2,467,895) and 1-ethoxycarbonyl-3-(2-nitrophenyl)thiourea (20.0 g of a 50 percent w/w wettable powder prepared as described in Example 3) with water (140 ml).

EXAMPLE 9

A suspension for oral administration for use as an anthelmintic is obtained by mixing 1-styrylpyridinium amsonate monohydrate (10 g; prepared as described in British Pat. No. 1,221,061), previously sifted through a 60 mesh British Standard sieve, and 1-ethoxycarbonyl-3-(2-nitrophenyl)thiourea (20.0 g of a 50 percent w/w wettable powder prepared as described in Example 3) with water (140 ml).

We claim:

1. Method for the treatment of helminth infections in man and domestic animals which comprises administering to man or a domestic animal infected with helminths an anthelmintically effective amount of at least one benzene derivative of the formula:

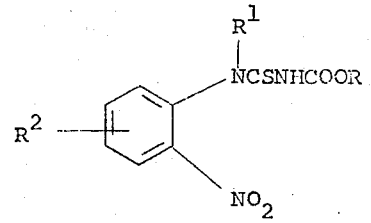

wherein R represents an aliphatic hydrocarbon group of 1 to 4 carbon atoms which is unsubstituted or substituted by halogen or alkoxy of 1 to 4 carbon atoms, $R^1$ represents hydrogen or methyl, and $R^2$ represents hydrogen, halogen, alkyl of 1 to 4 carbon atoms, alkanoylamino of 1 to 4 carbon atoms which is unsubstituted or substituted by a cycloalkyl group of 3 to 6 carbon atoms, alkoxycarbonylamino of 2 to 4 carbon atoms, alkanoyl of 2 to 4 carbon atoms, benzoyl or N-methylmethanesulphonylamino.

2. Method according to claim 1 in which the man or domestic animal is infected with parasitic nematode worms.

3. Method according to claim 1 in which R represents methyl, ethyl, allyl or propargyl.

4. Method according to claim 1 in which $R^2$ represents hydrogen.

5. Method according to claim 1 in which R represents methyl or ethyl and $R^1$ and $R^2$ represent hydrogen.

6. Method according to claim 1 in which the dose of benzene derivative administered to the man or domestic animal is 5 mg. to 1,000 mg. per kilogram of body weight.

7. Method according to claim 6 in which the dose of benzene derivative administered to the man or domestic animal is 25 mg. to 250 mg. per kilogram of body weight.

8. Method according to claim 1 in which the domestic animals treated are cattle, sheep, pigs, goats, poultry or equines.

9. Method according to claim 1 in which R is ethyl, $R^1$ is hydrogen, and $R^2$ is isopropoxycarbonylamino.

10. Medicated animal feedstuffs comprising an animal feedstuff and 0.001 to 3 percent by weight of a benzene derivative of the formula:

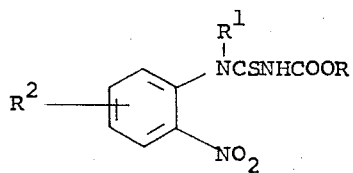

wherein R represents an aliphatic hydrocarbon group of 1 to 4 carbon atoms which is unsubstituted or substituted by halogen or alkoxy of 1 to 4 carbon atoms, $R^1$ represents hydrogen or methyl, and $R^2$ represents hydrogen, halogen, alkyl of 1 to 4 carbon atoms, alkanoylamino of 1 to 4 carbon atoms which is unsubstituted or substituted by a cycloalkyl group of 3 to 6 carbon atoms, alkoxycarbonylamino of 2 to 4 carbon atoms, alkanoyl of 2 to 4 carbon atoms, benzoyl or N-methylmethanesulphonylamino.

11. Medicated animal feedstuffs according to claim 10 which include, as auxiliary therapeutic agent, a fasciolicide or anthelmintic.

* * * * *